United States Patent
Zusman

(10) Patent No.: US 9,939,315 B2
(45) Date of Patent: Apr. 10, 2018

(54) TWO-WIRE ELECTRONICS INTERFACE SENSOR WITH INTEGRATED MECHANICAL TRANSDUCING AND TEMPERATURE MONITORING CAPABILITY

(71) Applicant: Vibration Measurement Solutions, Inc., Houston, TX (US)

(72) Inventor: George V. Zusman, Houston, TX (US)

(73) Assignee: Vibration Measurement Solutions, Inc., Houston, TX (US)

( * ) Notice: Subject to any disclaimer, the term of this patent is extended or adjusted under 35 U.S.C. 154(b) by 295 days.

(21) Appl. No.: 14/821,727

(22) Filed: Aug. 8, 2015

(65) Prior Publication Data

US 2017/0038247 A1 Feb. 9, 2017

(51) Int. Cl.
*G01H 11/08* (2006.01)
*G01K 1/02* (2006.01)

(52) U.S. Cl.
CPC ............. *G01H 11/08* (2013.01); *G01K 1/024* (2013.01)

(58) Field of Classification Search
USPC ...................................... 340/538.11; 370/297
See application file for complete search history.

(56) References Cited

U.S. PATENT DOCUMENTS 4,646,083 A * 2/1987 Woods .................. E21B 47/122
340/855.3
4,700,569 A * 10/1987 Michalski ........... G01F 23/2962
367/908

4,706,069 A * 11/1987 Tom ...................... G08B 13/191
310/319

(Continued)

FOREIGN PATENT DOCUMENTS

JP 63032326 A * 2/1988
JP 05188030 A * 7/1993
JP 2006118449 A * 5/2006

OTHER PUBLICATIONS

Carter et al ("Handbook of Operation Amplifier Applications", TI Application Report SBOA092A, Oct. 2001, pp. 63-68).*

(Continued)

*Primary Examiner* — Clayton E Laballe
*Assistant Examiner* — Leon W Rhodes, Jr.
(74) *Attorney, Agent, or Firm* — Walter W. Duft

(57) ABSTRACT

A sensor with integrated mechanical transducing and temperature monitoring capability is provided. The sensor includes housing containing a transducer, a temperature sensor with associated bias, a summing circuit, and a two-wire cable connector. The transducer is operable to output a dynamic transducer waveform that corresponds to dynamic mechanical perturbations sensed by the transducer. The temperature sensor is operable to output a quasi-static temperature waveform that corresponds to temperatures sensed by the temperature sensor. The summing circuit is operable to combine the transducer waveform and the temperature waveform into a composite modulated voltage bias output signal or a modulated current bias output signal. The two-wire cable connector is accessible on an outside of the housing and is connectable to a two wire cable that delivers power to the sensor from a power source and delivers the composite output signal from the sensor to a remote data acquisition circuit.

18 Claims, 2 Drawing Sheets

(56) References Cited

U.S. PATENT DOCUMENTS

| | | | |
|---|---|---|---|
| 5,039,954 A | | 8/1991 | Bult et al. |
| 7,042,230 B1 | * | 5/2006 | Izadnegahdar ....... G01L 9/0019 |
| | | | 324/609 |
| 7,334,483 B2 | * | 2/2008 | Sato ........................ G01L 9/085 |
| | | | 73/708 |
| 8,134,385 B2 | | 3/2012 | Gwinn |
| 8,179,121 B2 | | 5/2012 | Hynd et al. |
| 9,054,604 B2 | | 6/2015 | Horie |
| 2011/0106498 A1 | | 5/2011 | Denton, Sr. |
| 2016/0178441 A1 | * | 6/2016 | Rud ........................ G01H 17/00 |
| | | | 374/117 |

OTHER PUBLICATIONS

S. Mayo, Basics of IEPE accelerometers, Meggitt Sensing Systems, Feb. 2013, 11 pages.
Wilcoxon Research, Piezoelectric accelerometer design, Meggit Sensing Systems, May 2009, 42 pages.

* cited by examiner

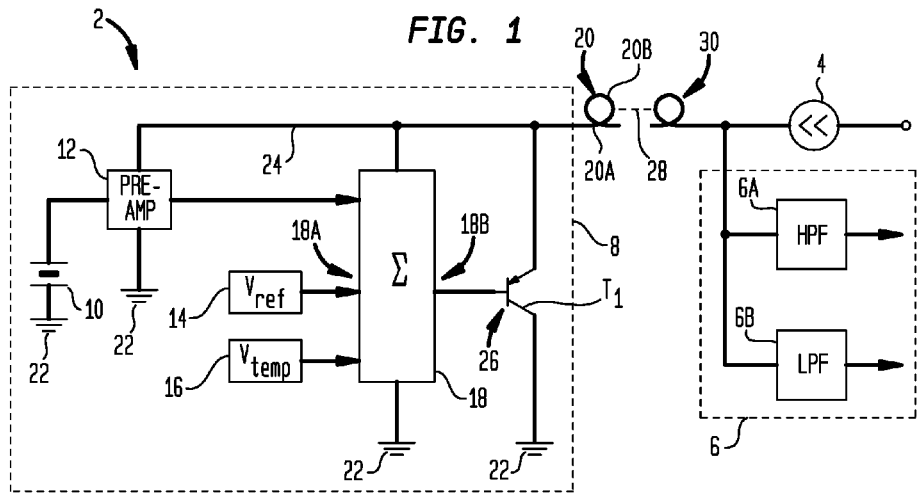

TWO-WIRE ELECTRONICS INTERFACE SENSOR WITH INTEGRATED MECHANICAL TRANSDUCING AND TEMPERATURE MONITORING CAPABILITY

BACKGROUND

1. Field

The present disclosure relates to sensors with mechanical transducing capability. More particularly, the disclosure is directed to sensors having a piezoelectric transducer and an integrated preamplifier and a two-wire interface connected via a cable to a constant current or constant voltage power source for power input, and to a data acquisition circuit for signal output.

2. Description of the Prior Art

By way of background, piezoelectric transducers used for detection of vibrations and other dynamic physical parameters are often installed at locations that are remote from monitoring equipment that evaluates the sensor output. To overcome the noise and interference inherent in such environments, line drive piezoelectric sensors have been developed that combine a piezoelectric transducer and a built-in preamplifier that transforms the high impedance charge mode output of the transducer into a low impedance voltage or current output signal. A two-wire interface and associated two-wire cable (such as a coaxial cable) connects the sensor to a remote constant current or constant voltage power source for power input, and to a remote data acquisition circuit for signal output. The two-wire cable may be as long as several hundred meters. In some piezoelectric sensor designs, the sensor is powered by a constant current power source and the sensor's output is a modulated bias voltage signal. In other piezoelectric sensor designs, the sensor is powered by a constant voltage power source and the sensor's output is a modulated bias current signal.

Line drive piezoelectric sensors as described above are designed to measure only a single parameter, such as vibration. If an additional parameter needs to be measured, such as temperature in situations where both parameters are need to be monitored at the same measurement location, a separate sensor and lengthy cable connection to a remote unit are required. This redundancy adds design complexity and expense.

It is to improvements in line drive piezoelectric sensing technology that the present disclosure is directed. In particular, an integrated sensor is proposed that combines mechanical transducing with temperature monitoring.

SUMMARY

In accordance with example embodiments of the present disclosure, a sensor with integrated mechanical transducing and temperature monitoring capability is provided. The sensor includes housing containing a transducer, a temperature sensor, a summing circuit, and a two-wire cable connector. The transducer is operable to output a dynamic transducer waveform that corresponds to dynamic mechanical perturbations sensed by the transducer. The temperature sensor is operable to output a quasi-static temperature waveform that corresponds to temperatures sensed by the temperature sensor. The summing circuit is operable to combine the transducer waveform and the temperature waveform to generate a composite bias-modulating output signal. The two-wire cable connector is accessible on an outside of the housing and is connectable to a two wire cable that delivers power to the sensor from a remote power source and delivers the composite output signal from the sensor to a remote data acquisition circuit.

In an embodiment, the transducer comprises a piezoelectric transducer.

In an embodiment, the summing circuit comprises a summing amplifier.

In an embodiment, the summing amplifier inputs the transducer waveform from a sensor preamplifier in the housing that is electrically connected to the transducer and generates a dynamically-varying voltage embodying the transducer waveform.

In an embodiment, the summing amplifier inputs a quasi-static voltage embodying the temperature waveform from the temperature sensor.

In an embodiment, the summing amplifier inputs a reference voltage from a voltage reference source in the housing, the reference voltage providing a direct current bias component of the composite output signal.

In an embodiment, the summing amplifier outputs a time-varying voltage output embodying a composite waveform that represents a summation of the transducer waveform and the temperature waveform, with direct current bias provided by the reference voltage from the voltage reference source.

In an embodiment, the two-wire cable connector comprises a first terminal and a second terminal, the first terminal being electrically connected to a power supply rail in the housing and to the output side of the summing amplifier, the second terminal being electrically connected to a circuit common rail in the housing.

In an embodiment, the two-wire cable connector is electrically connected to the output side of the summing circuit via a voltage repeater, and the output signal from the sensor is a modulated bias voltage signal.

In an embodiment, the two-wire cable connector is electrically connected to the output side of the summing circuit via a voltage-to-current converter, and the output signal from the sensor comprises a modulated bias current signal.

In another aspect, a sensor with integrated transducing and temperature monitoring capability is provided in combination with (1) a constant current or constant voltage power source, and (2) a data acquisition circuit that separately acquires the transducer waveform and the temperature waveform from the output signal of the sensor.

In another aspect, a method for sensing mechanical perturbations with integrated temperature monitoring capability is provided. In a housing, an electrical transducer waveform is generated that corresponds to mechanical perturbations sensed by a transducer in the housing. In the housing, an electrical temperature waveform is generated that corresponds to temperatures sensed by a temperature sensor in the housing. In the housing, the transducer waveform and the temperature waveform are combined into a composite bias-modulating output signal. Using a two-wire cable connector accessible on an outside of the housing that is connectable to a two wire cable, power is delivered to the housing from a power source and the composite output signal is delivered from the housing to a remote data acquisition circuit.

BRIEF DESCRIPTION OF THE DRAWINGS

The foregoing and other features and advantages will be apparent from the following more particular description of example embodiments, as illustrated in the accompanying Drawings, in which:

FIG. 1 is a schematic diagram showing a sensor according to a first example embodiment, with the sensor being shown in combination with a constant current power source and a data acquisition circuit;

FIG. 2 is a schematic diagram showing an example sensor preamplifier that may be incorporated in the sensor of FIG. 1 and/or the sensor of FIG. 6;

FIG. 3 is a schematic diagram showing a first example summing circuit that may be incorporated in the sensor of FIG. 1;

FIG. 3A is a schematic diagram showing a second example summing circuit that may be incorporated in the sensor of FIG. 1;

FIG. 4 is a schematic diagram showing an example voltage reference source that may be incorporated in the sensor of FIG. 1;

FIG. 5 is a schematic diagram showing an example voltage generating temperature sensor that may be incorporated in the sensor of FIG. 1;

DETAILED DESCRIPTION OF EXAMPLE EMBODIMENTS

Figure 6:
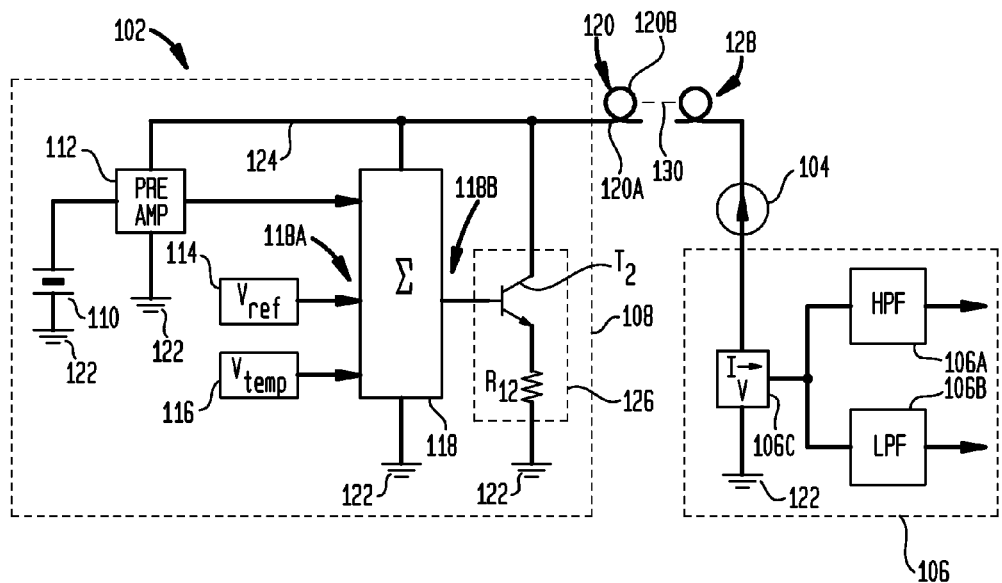
FIG. 6 is a schematic diagram showing a sensor according to a second example embodiment, with the sensor being shown in combination with a constant voltage power source and a data acquisition circuit.

Turning now to the drawing figures, which are not necessarily to scale, like reference numbers will be used to represent like elements in all of the several views. FIG. 1 illustrates a first example sensor 2 with integrated mechanical transducing and temperature monitoring capability that may be constructed in accordance with the present disclosure. The sensor 2 is designed to operate with a constant current power source 4 and to provide a time-varying voltage output to a data acquisition circuit 6. The output is a composite modulated bias voltage signal that includes both a dynamic transducer waveform and a quasi-static temperature waveform. As will be described below in connection with FIG. 6, an alternative sensor 102 is designed to operate with a constant voltage power source 104 and to provide a time-varying current output to a data acquisition circuit 106. The output of the sensor 102 includes both a dynamic transducer waveform and a quasi-static temperature waveform, but the output is a composite modulated bias current signal.

In the embodiment of FIG. 1, the sensor 2 includes a housing 8 having various circuit components therein. These circuit components include a transducer 10, a sensor preamplifier 12, a voltage reference source 14, a voltage outputting temperature sensor 16, a summing circuit 18, and a two-wire connector 20.

The transducer 10 may be implemented as a piezoelectric transducer or any other suitable transducer technology that supports mechanical sensing of dynamic physical parameters such as vibrations, dynamic pressure, dynamic force, etc. The transducer 10 is electrically connected to a circuit common rail 22 within the sensor housing 8, which may be a ground connection. The other side of the transducer 10 is electrically connected to the sensor preamplifier 12. The sensor preamplifier 12 is operable to receive the transducer output, such as a high impedance charge mode output in the case of a piezoelectric transducer, and convert it to a low impedance, time-varying voltage signal embodying a transducer waveform that corresponds to the transducer's mechanical perturbations. If the piezoelectric transducer 10 is used to measure a dynamic parameter that varies relatively rapidly, such as vibrations, dynamic pressure, dynamic force, etc., the transducer output will be a dynamic waveform having a relative high frequency signal (as compared to the quasi-static temperature waveform discussed below).

An example embodiment of the sensor preamplifier 12 is shown in FIG. 2. In this embodiment, the sensor preamplifier 12 is constructed as a charge amplifier that includes a suitable operational amplifier OpAmp1 whose inverting input is electrically connected to the output of the transducer 10 and whose non-inverting input is electrically connected to the circuit common rail 22. A feedback capacitor C1 is connected in parallel with a bias resistor R1 between the operational amplifier's output and its inverting input. Although not shown in FIG. 2, power is provided to the positive power supply pin of OpAmp1 from a power supply rail 24 in the sensor housing 8. The negative power supply pin of OpAmp1 is electrically connected to the circuit common rail 22. The output of OpAmp2 is represented by circuit point Out1 in FIG. 2. This circuit point is electrically connected to the input side of the summing circuit 18. The preamplifier output, which embodies the transducer waveform, is thus provided as an input to the summing circuit 18. It will be appreciated that many other circuit designs may be used to provide the sensor preamplifier 12, and that FIG. 2 merely shows one possible embodiment. One such alternative design is the voltage amplifier 112 shown in FIG. 7 and described in more detail below.

The voltage reference source 14 is operable to generate a direct current (d.c.) reference voltage for biasing the sensor's output signal. An example embodiment is shown in FIG. 4. In this embodiment, the voltage reference source includes a reverse-biased Zener diode Z1 and a resistor R2. The anode of Zener diode Z1 is electrically connected to circuit common rail 22. The cathode of Zener diode Z1 is electrically connected to one side of resistor R2. The other side of resistor R2 is electrically connected to power supply rail 24 and to the output of the voltage reference source 14, represented by circuit point Out2 in FIG. 4. This circuit point is electrically connected to the input side of the summing circuit 18. The voltage reference source's d.c. reference voltage is thus provided as an input to the summing circuit 18. The connection to power supply rail 24 may be a direct connection, as shown in FIG. 4, or it may be an indirect connection, as described below in connection with FIG. 3A. It will be appreciated that many other circuit designs may be used to provide the voltage reference source 14, and that FIG. 4 merely shows one possible embodiment.

The voltage outputting temperature sensor 16 is operable to generate a time-varying voltage signal embodying a temperature waveform that corresponds to changing temperatures in close proximity to the point of measurement of the transducer 10. Any suitable voltage outputting temperature sensing device may be used. The temperature sensor 16 may be connected as shown in FIG. 5, with one side of the sensor being electrically connected to circuit common rail 22 and the other side being electrically connected to power supply rail 24, either directly as shown in FIG. 5, or indirectly as will be described below in connection with FIG. 3A. The output side of the temperature sensor 16 is shown at circuit point Out3 in FIG. 5. This circuit point is electrically connected to the input side of the summing circuit 18. The temperature sensor output, which embodies the temperature waveform, is thus provided as an input to the summing circuit 18.

Unlike the dynamic transducer waveform, which tends to vary relatively rapidly, the temperature waveform output by the temperature sensor 16 will normally be quasi-static in nature. The temperature waveform will be time-varying, but of relatively low frequency compared to the frequency of the transducer waveform. It will be appreciated that many other circuit designs may be used to provide the voltage outputting temperature sensor 16, and that FIG. 5 merely shows one possible embodiment.

The summing circuit 18 combines the dynamic transducer waveform and the quasi-static temperature waveform into a composite output waveform that modulates the reference voltage bias supplied by the voltage reference source 14. As shown in FIG. 1, the summing circuit 18 has an input side 18A and an output side 18B. The input side 18A of the summing circuit 18 may include one or more input elements that electrically connect to circuit point Out1 of the sensor preamplifier 12 to receive the transducer waveform, circuit point Out2 of the voltage reference source 14 to receive the reference voltage, and circuit point Out3 of the temperature sensor 16 to receive the temperature waveform. The output side 18B of the summing circuit 18 has an output element that electrically connects to the power supply rail 24 via transistor T1 in FIG. 1 (described below) and provides a composite waveform representing a summation of the transducer waveform, the temperature waveform, and the d.c. reference voltage bias supplied from the voltage reference source. Example embodiments of the summing circuit 18 are shown in FIGS. 3 and 3A, but it will be appreciated that many other circuit designs may be used to provide the desired summing functionality.

In FIG. 3, the summing circuit 18 is constructed as a summing amplifier having a suitable operational amplifier OpAmp2. The inverting input of OpAmp2 is electrically connected via resistor R3 to the output of the sensor preamplifier 12 at circuit point Out1. This connection represents a first input element 18A-1 of the summing circuit's input side 18. The inverting input of OpAmp2 is also electrically connected via resistor R4 to the output of the voltage reference source 14 at circuit point Out2. This connection represents a second input element 18A-2 of the summing circuit's input side 18. The inverting input of OpAmp2 is also electrically connected via resistor R5 to the output of the temperature sensor 16 at circuit point Out1. This connection represents a third input element 18A-3 of the summing circuit's input side 18. If desired, the values of resistors R3, R4 and R5 may be selected to give desired weights to the incoming voltages to be summed by the summing circuit 18.

The non-inverting input of OpAmp2 is electrically connected to circuit common rail 22. The output of OpAmp2 is electrically connected to its inverting input via feedback resistor R6. The output of OpAmp2 represents the output side 18B of the summing circuit 18. This output includes the d.c. bias supplied by the voltage reference source 14, as modulated by the dynamic transducer waveform from the sensing preamplifier 12 and the quasi-static temperature waveform from the temperature sensor 16.

An alternative embodiment of the summing circuit 18 is shown in FIG. 3A. In this embodiment, the summing circuit 18 is constructed as a differential amplifier having a suitable operational amplifier OpAmp3. The inverting input of OpAmp3 is electrically connected to an input resistor R7 to provide a first input element 18A1 of the summing circuit's input side 18A. This input is electrically connected to the output of the sensor preamplifier 12 at circuit point Out1. The non-inverting input of OpAmp3 is electrically connected to the output of the voltage reference source 14 at circuit point Out2 to provide a second input element 18A-2 of the summing circuit's input side 18A. The temperature sensor 16 is connected in series between the anode side of the voltage reference source 14 and circuit common rail 22. As such, the non-inverting input of OpAmp3 is indirectly electrically connected to the output of the temperature sensor 16 at circuit point Out3 to provide a third input 18A-3 of the summing circuit's input side 18A. Power is supplied to the voltage reference source 14 and the temperature sensor 16 via resistor R11, which is electrically connected between power supply rail 24 and the cathode side of the voltage reference source. In this configuration, the combined voltage output of the voltage reference source 14 and the temperature sensor 16 is provided at the non-inverting input of OpAmp3. This input voltage varies according to the quasi-static temperature waveform from the temperature sensor 16 but has a voltage bias provided by the reference voltage source 14.

In FIG. 3A, the operational amplifier OpAmp3 combines the dynamic transducer waveform and the quasi-static transducer waveform. The inverting input of the operational amplifier OpAmp3 is biased by the R8/R9 voltage divider, which is configured using resistors R8 and R9 electrically connected between power supply rail 24 and circuit common rail 22. The inverting input's connection to the R8/R9 voltage divider is through input resistor R10. The voltage on power rail 24 is reduced by the R8/R9 voltage divider to a level that is close to (but different than) the voltage delivered to the non-inverting input of OpAmp3 from the voltage reference source 14 in combination with the temperature sensor 16. This differential input is amplified by OpAmp3 and results in the quasi-static temperature waveform being provided at the output of OpAmp3. The dynamic transducer waveform delivered from resistor R7 represents a further differential input that is amplified by OpAmp3 and delivered at the output of OpAmp3. The composite waveform appearing at the output of OpAmp3 represents the summing circuit's output side 18B.

Returning now to FIG. 1, the two-wire cable connector 20 has a first terminal 20A and a second terminal 20B. The second terminal 20B of the cable connector 20 is electrically connected to circuit common rail 22. The first terminal 20A of the cable connector 20 is electrically connected to power supply rail 24 in order to supply power thereto. The first terminal 20A is also electrically connected to receive the d.c. biased transducer and temperature waveforms delivered from the output side 18B of the summing circuit 18.

In the illustrated embodiment of FIG. 1, wherein the output from the sensor 2 is a time-varying voltage signal, a voltage repeater 26 may be placed between the first terminal 20A of the cable connector 20 and the output side 18B of the summing circuit 18. The voltage repeater 26 may be implemented as a bipolar junction transistor T1 acting as a voltage amplifier in a common collector configuration. The base of transistor T1 is electrically connected to the output side 18B of the summing circuit 18, for example the output of OpAmp2 in the FIG. 3 embodiment or the output of OpAmp3 in the FIG. 3A embodiment. The emitter of transistor T1 is connected to power supply rail 24. The collector of transistor T1 is connected to circuit common rail 22.

With continuing reference to FIG. 1, the two-wire cable connector 20 is operably connectable to one end of a two-wire cable 28 (such as a coaxial cable) whose other end connects to a remote two-wire cable connector 30. The two-wire cable 28 delivers power to the sensor 2 from the constant current power source 4, and delivers the sensor's signal output to the data acquisition circuit 6. In the embodiment of FIG. 1 wherein the sensor 2 outputs a modulated voltage bias signal, the circuit 6 may include a first circuit portion 6A for extracting the dynamic transducer waveform from the remainder of the signal. The circuit 6 may further include a second circuit portion 6A for extracting the quasi-static temperature waveform from the remainder of the signal. In an example embodiment, the first circuit portion 6A may include a suitable high pass filter circuit and the second circuit portion 6B may include a suitable low pass filter circuit.

Turning now to FIG. 6, an alternative transducer sensor 102 is shown. The sensor 102 is similar in most respects to the sensor 2 of FIG. 1, except that the sensor 102 is powered by a constant voltage power source 104 and generates a modulated bias current output signal instead of a modulated bias voltage signal. The components of the sensor 102 shown in FIG. 6 substantially correspond to the components of the sensor 2 shown in FIG. 1, and this correspondence is indicated by the use of corresponding reference numbers incremented by 100.

Like the sensor 2 of FIG. 1, the sensor 102 of FIG. 6 includes a housing 8 having various circuit components therein. These circuit components include a transducer 110, a sensor preamplifier 112, a voltage reference source 114, a voltage outputting temperature sensor 116, a summing circuit 118, and a two-wire connector 120. The foregoing circuit components are interconnected in the same manner as the components of sensor 2, and operate in substantially the same way to combine a dynamic transducer waveform from the sensor preamplifier 112 with a quasi-static temperature waveform from the temperature sensor 116, with d.c. bias supplied by the voltage reference source 114.

The main differences between the sensor 102 of FIG. 6 and the sensor 2 of FIG. 1 are that a modified sensor preamplifier 112 may be used, and the voltage repeater 26 is replaced by a voltage-to-current converter 126.

Figure 7:
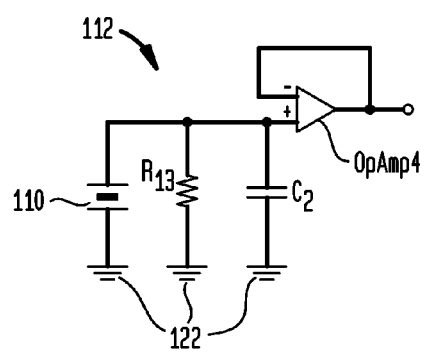
FIG. 7 is a schematic diagram showing an example sensor preamplifier that may be incorporated in the sensor of FIG. 6 and/or the sensor of FIG. 1.

An example embodiment of the sensor preamplifier 112 is shown in FIG. 7. In this embodiment, the sensor preamplifier 112 includes a suitable operational amplifier OpAmp4 configured as a voltage follower, with a bias resistor R13 and a capacitor C2 wired in parallel with the transducer 110 at the non-inverting input. The capacitor C2 is optional, and is used to extend the frequency response to the low side and to add temperature stability. It will be appreciated that many other circuit designs may be used to provide the sensor preamplifier 112, and that FIG. 7 merely shows one possible embodiment. One such alternative design is the charge amplifier 112 shown in FIG. 2, which was previously described.

Returning to FIG. 6, the voltage-to-current converter may be embodied as a bipolar junction transistor T2 wired in a common emitter configuration with a resistor R12 connecting the emitter to circuit common rail 122. The base of transistor T2 is connected to the output side 18B of the summing circuit 118. The collector of transistor T2 is connected to power supply rail 124. As the base voltage changes in response to the changing output of the summing circuit 118, a corresponding current flows through the emitter collector pathway.

The result is a composite modulated bias current output signal at the cable connector terminal 120A, the components of which include variable current representations of the transducer waveform and the temperature waveform. The composite output signal is transmitted along the two-wire cable 130 to the data acquisition circuit 106. The data acquisition circuit 106 is similar to the data acquisition circuit 6 in FIG. 1 in that it includes a high-pass filter 106A for acquiring the dynamic transducer waveform and a low pass filter 106B for acquiring the quasi-static temperature waveform. In addition, the data acquisition circuit 106 may include a current-to-voltage converter 106C that converts the variable current composite output signal to a variable voltage composite output signal.

Accordingly, a sensor with integrated mechanical transducing and temperature monitoring capability has been disclosed. Although various example embodiments have been shown and described, it should be apparent that many variations and alternative embodiments could be implemented in accordance with the disclosure. It is understood, therefore, that the invention is not to be in any way limited except in accordance with the spirit of the appended claims and their equivalents.

What is claimed is:

1. A sensor with integrated mechanical transducing and temperature monitoring capability, comprising:
    a housing;
    a transducer in said housing operable to output a dynamic transducer waveform that corresponds to dynamic mechanical perturbations sensed by said transducer;
    a temperature sensor in said housing operable to output a quasi-static temperature waveform that corresponds to temperatures sensed by said temperature sensor;
    a voltage reference source in said housing operable to provide a substantially constant reference voltage;
    a summing circuit in said housing operable to combine said transducer waveform, said temperature waveform and said reference voltage and provide a time-varying summing circuit output embodying a combination of said transducer waveform and said temperature waveform with bias provided by said reference voltage;
    a two-wire cable connector accessible on an outside of said housing that is connectable to a two wire cable that delivers power to said sensor from a remote power source and delivers a composite output signal from said sensor to a remote data acquisition circuit; and
    said composite output signal delivered at said two-wire connector including said summing circuit output applied at said two-wire connector as either a modulated bias voltage signal or a modulated bias current signal, with said voltage reference source causing or effecting said bias on said composite output signal.

2. The sensor of claim 1 wherein said transducer comprises a piezoelectric transducer.

3. The sensor of claim 2, wherein said summing circuit inputs said transducer waveform from a sensor preamplifier in said housing that is electrically connected to said transducer and generates a dynamically-varying voltage embodying said transducer waveform.

4. The sensor of claim 3, wherein said summing circuit inputs a quasi-static voltage embodying said temperature waveform from said temperature sensor.

5. The sensor of claim 1, wherein said two-wire cable connector comprises a first terminal and a second terminal, said first terminal being electrically connected to a power supply rail in said housing and to said output side of said summing amplifier, said second terminal being electrically connected to a circuit common rail in said housing.

6. The sensor of claim 1, wherein said two-wire cable connector is electrically connected to said output side of said summing circuit via a voltage repeater, and wherein said output signal from said sensor comprises a modulated bias voltage signal.

7. The sensor of claim 1, wherein said two-wire cable connector is electrically connected to said output side of said summing circuit via a voltage-to-current converter, and wherein said output signal from said sensor comprises a modulated bias current signal.

8. The sensor of claim 1, in combination with (1) a constant current or constant voltage power source, and (2) a data acquisition circuit that separately acquires said transducer waveform and said temperature waveform from said output signal of said sensor.

9. A piezoelectric sensor with integrated temperature monitoring capability, comprising:
   a housing;
   a piezoelectric transducer in said housing;
   a sensor preamplifier in said housing electrically connected to said piezoelectric transducer, said sensor preamplifier being operable to generate a time-varying voltage signal embodying a transducer waveform that corresponds to mechanical perturbations experienced by said piezoelectric transducer;
   a voltage reference source in said housing operable to generate a substantially constant reference voltage;
   a voltage outputting temperature sensor in said housing operable to generate a time-varying voltage embodying a temperature waveform that corresponds to changing temperatures sensed by said temperature sensor;
   a summing circuit in said housing having an input side electrically connected to input said time-varying voltage embodying said transducer waveform from said sensor preamplifier, said reference voltage from said voltage reference source, and time-varying voltage embodying said temperature waveform from said temperature sensor;
   said summing circuit having an output side that outputs a time-varying summing circuit output embodying a combination of said transducer waveform and said temperature waveform, with bias provided by said reference voltage from said voltage reference source;
   a two-wire cable connector in said housing having a first terminal and a second terminal, said first terminal being electrically connected to a power supply rail in said housing and to said output side of said summing amplifier, said second terminal being electrically connected to a circuit common rail in said housing; and
   said two-wire cable connector being operably connectable to a two-wire cable that delivers power to said sensor from a remote constant current or constant voltage power source, and delivers a composite output signal from said sensor to a remote data acquisition circuit, said composite output signal including said summing circuit output applied at said two-wire connector as either a modulated bias voltage signal or a modulated bias current signal, with said voltage reference source causing or effecting said bias on said composite output signal.

10. The sensor of claim 9, wherein said two-wire cable connector is electrically connected to said output side of said summing circuit via a voltage repeater, and wherein said output signal from said sensor comprises a modulated bias voltage signal.

11. The sensor of claim 9, wherein said two-wire cable connector is electrically connected to said output side of said summing circuit via a voltage-to-current converter, and wherein said output signal from said sensor comprises a modulated bias current signal.

12. The sensor of claim 9, wherein said summing circuit comprises an operational amplifier having a single input thereof electrically connected to input said transducer waveform from said sensor preamplifier, said reference voltage bias from said voltage reference source, and said temperature waveform from said temperature sensor.

13. The sensor of claim 9, wherein said summing circuit comprises an operational amplifier having a first input thereof electrically connected to input said transducer waveform from said sensor preamplifier, and a second input thereof electrically connected to input said reference voltage bias from said voltage reference source and said temperature waveform from said temperature sensor.

14. The sensor of claim 13, wherein said temperature sensor is electrically connected in series with said voltage reference source, and said second input of said operational amplifier inputs a combination of said reference voltage bias and said temperature waveform from said voltage reference source.

15. The sensor of claim 14, wherein said first input of said operational amplifier is biased by a voltage divider electrically connected between said power supply rail and said circuit common rail.

16. The sensor of claim 9, in combination with a constant current or constant voltage power source.

17. The sensor of claim 9, in combination with a data acquisition circuit that separately acquires said transducer waveform and said temperature waveform from said output signal of said sensor.

18. A method for sensing mechanical perturbations with integrated temperature monitoring capability, comprising:
   in a housing, generating from a transducer in said housing an electrical dynamic transducer waveform that corresponds to mechanical perturbations sensed by said transducer;
   in said housing, generating from a temperature sensor in said housing an electrical quasi-static temperature waveform that corresponds to temperatures sensed by said temperature sensor;
   in said housing, generating from a voltage reference source a substantially constant reference voltage;
   in said housing, combining said transducer waveform, said temperature waveform and said reference voltage into a composite bias-modulating output signal with voltage or current biasing provided by said reference voltage, with said voltage reference source causing or effecting said bias on said composite output signal; and
   using a two-wire cable connector accessible on an outside of said housing that is connectable to a two wire cable, delivering power to said housing from a remote power source and delivering said composite output signal from said housing to a remote data acquisition circuit.

* * * * *